United States Patent
Bolz et al.

(10) Patent No.: US 9,324,175 B2
(45) Date of Patent: Apr. 26, 2016

(54) MEMORY COHERENCY IN GRAPHICS COMMAND STREAMS AND SHADERS

(75) Inventors: Jeffrey A. Bolz, Sant Clara, CA (US); Patrick R. Brown, Wake Forest, NC (US)

(73) Assignee: NVIDIA Corporation, Santa Clara, CA (US)

( * ) Notice: Subject to any disclaimer, the term of this patent is extended or adjusted under 35 U.S.C. 154(b) by 742 days.

(21) Appl. No.: 12/849,701

(22) Filed: Aug. 3, 2010

(65) Prior Publication Data

US 2011/0063313 A1    Mar. 17, 2011

Related U.S. Application Data

(60) Provisional application No. 61/241,847, filed on Sep. 11, 2009.

(51) Int. Cl.
*G06T 15/00* (2011.01)
*G06T 15/80* (2011.01)
*G06T 1/20* (2006.01)
*G09G 5/36* (2006.01)
*G06F 13/16* (2006.01)

(52) U.S. Cl.
CPC .............. *G06T 15/005* (2013.01); *G06T 1/20* (2013.01); *G06T 15/80* (2013.01); *G09G 5/363* (2013.01); *G06F 13/1605* (2013.01)

(58) Field of Classification Search
CPC ........... G06T 1/60; G06T 15/005; G06T 1/20; G06T 2210/52; G06T 15/80
USPC .................................................. 345/531, 535
See application file for complete search history.

(56) References Cited

U.S. PATENT DOCUMENTS

| 2007/0018990 A1* | 1/2007 | Shreiner ....................... 345/505 |
| 2010/0110089 A1* | 5/2010 | Paltashev et al. ............. 345/522 |
| 2010/0141659 A1* | 6/2010 | Bourd et al. ................... 345/442 |

OTHER PUBLICATIONS

McCool, Michael D., Zheng Qin, and Tiberiu S. Popa. "Shader metaprogramming." Proceedings of the ACM SIGGRAPH/EUROGRAPHICS conference on Graphics hardware. Eurographics Association, 2002.*

Ryoo, Shane, et al. "Program optimization space pruning for a multithreaded gpu." Proceedings of the 6th annual IEEE/ACM international symposium on Code generation and optimization. ACM, 2008.*

* cited by examiner

*Primary Examiner* — Ming Hon
*Assistant Examiner* — Sarah Le
(74) *Attorney, Agent, or Firm* — Artegis Law Group, LLP

(57) ABSTRACT

One embodiment of the present invention sets forth a technique for performing a computer-implemented method that controls memory access operations. A stream of graphics commands includes at least one memory barrier command. Each memory barrier command in the stream of graphics command delays memory access operations scheduled for any command specified after the memory barrier command until all memory access operations scheduled for commands specified prior to the memory barrier command have completely executed.

20 Claims, 5 Drawing Sheets

MEMORY COHERENCY IN GRAPHICS COMMAND STREAMS AND SHADERS

CROSS-REFERENCE TO RELATED APPLICATIONS

This application claims benefit of United States provisional patent application entitled "API Extensions for Advanced Graphics Processing Units", filed on Sep. 11, 2009 and having a Ser. No. 61/241,847.

BACKGROUND OF THE INVENTION

1. Field of the Invention

The present invention relates generally to graphics processing and, more specifically, to memory coherency in graphics command streams and shaders.

2. Description of the Related Art

Shaders may perform random-access read and write operations to texture or buffer object memory locations through built-in image load, store, and atomic operations. However, the ability to perform such random-access read and write operations in a system that is highly pipelined and performs many operations concurrently results in graphics command stream execution order and synchronization inaccuracies, as the order in which texture or buffer object memory locations are read from or written to by one or more shaders is largely undefined.

For example, in a system that processes multiple primitives in parallel, a store operation issued by a shader when working on a first primitive might complete after a store operation for a second primitive, even if the first primitive was specified prior to the second primitive. This is problematic when the second primitive is dependent upon the first primitive. Further, the limitations on the order of thread launch and execution make some forms of cross-thread synchronization within a single set of primitives impossible. For example, having one thread poll a memory location written by another thread assumes that the other thread has already launched, performed a modification to the memory location, and ceased in execution—which is often not the case. Further, in systems with a parallel memory subsystem, transactions to different memory locations may be spread across multiple load/store units to maximize throughput. However, this behavior means that stores issued to different memory locations within a single shader invocation may not be visible to other threads in the order in which they were requested to execute.

As the foregoing illustrates, what is needed in the art is a mechanism for ensuring the coherency of memory read and write operations in a highly-pipelined system.

SUMMARY OF THE INVENTION

A method for an improved technique for controlling memory access operations. A stream of graphics commands includes at least one memory barrier command. Each memory barrier command in the stream of graphics command delays memory access operations scheduled for any command specified after the memory barrier command until all memory access operations scheduled for commands specified prior to the memory barrier command have completely executed.

A method for an improved technique for controlling memory access operations. A sequence of shader instructions is received that includes at least one of a memory barrier instruction, a memory access instruction marked as coherent, and a memory access instruction marked as volatile. Each shader instruction in the sequence of shader instructions that comprises either a memory barrier instruction, a memory access instruction marked as coherent, or a memory access instruction marked as volatile is executed. If the shader instruction comprises a memory barrier instruction, the execution of any memory access instructions subsequent to the memory barrier instruction in the sequence of shader instructions is stalled until all memory access instructions prior to the memory barrier instruction in the sequence of shader instructions have completely executed. If the shader instruction is a memory access instruction marked as coherent, data is transmitted to or retrieved from a memory that is accessible by a plurality of threads executing a shading program. If the shader instruction is a memory access instruction marked as volatile, then not eliminating redundant read or write operations involving an address associated with the memory access instruction.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
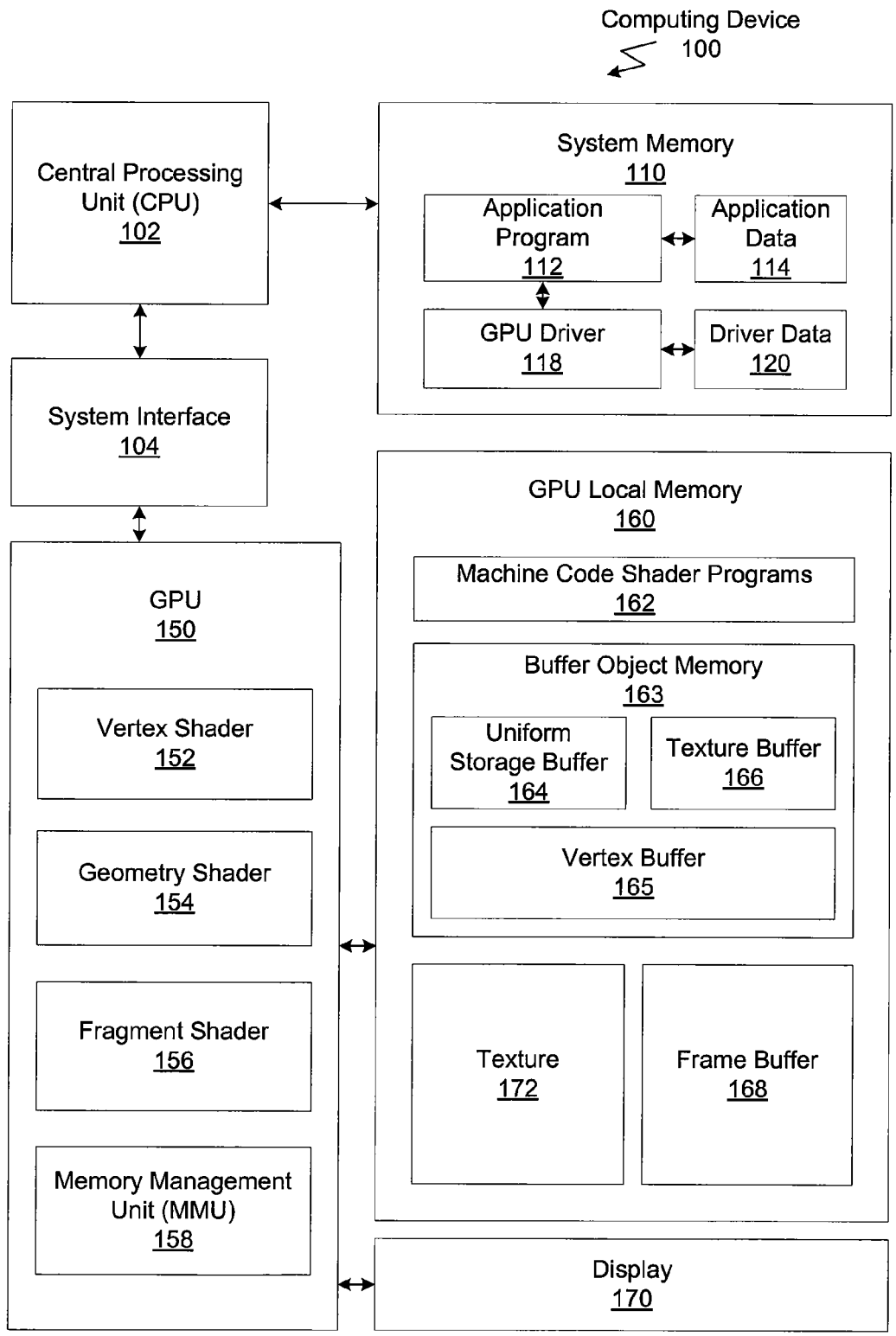
FIG. 1 is a conceptual diagram of a computing device configured to implement one or more aspects of the present invention.

FIG. 1 is a conceptual diagram of a computing device 100 configured to implement one or more aspects of the present invention. The computing device 100 includes a central processing unit (CPU) 102, a system interface 104, a system memory 110, a GPU 150, a GPU local memory 160 and a display 170. The CPU 102 connects to the system memory 110 and the system interface 104. The CPU 102 executes programming instructions stored in the system memory 110, operates on data stored in system memory 110 and communicates with the GPU 150 through the system interface 104, which bridges communication between the CPU 102 and GPU 150. In alternate embodiments, the CPU 102, GPU 150, system interface 104, or any combination thereof, may be integrated into a single processing unit. Further, the functionality of GPU 150 may be included in a chipset of in some other type of special purpose processing unit or co-processor. The system memory 110 stores programming instructions and data for processing by the CPU 102. The system memory 110 typically includes dynamic random access memory (DRAM) configured to either connect directly to the CPU 102 (as shown) or alternately, via the system interface 104. The GPU 150 receives instructions transmitted by the CPU 102 and processes the instructions in order to render graphics data and images stored in the GPU local memory 160. The GPU local memory 160 is any memory space accessible by the GPU 150 including local memory, system memory, on-chip memories, and peer memory. The GPU 150 displays certain graphics images stored in the GPU local memory 160 on the display 170.

The system memory 110 includes an application program 112, application data 114, a GPU driver 118 and GPU driver data 120. The application program 112 generates calls to a graphics API in order to produce a desired set of results, typically in the form of a sequence of graphics images. The application program 112 also transmits one or more shading programs to the graphics API for processing within the GPU driver 118. The high-level shading programs are typically source code text of high-level programming instructions that are designed to operate on one or more shaders within the GPU 150. The graphics API functionality is typically implemented within the GPU driver 118.

The GPU local memory 160 includes a set of machine code shader programs 162, a buffer object memory 163 and a texture memory 171. The machine code shader programs 162 are transmitted from the GPU driver 118 to GPU local memory 160. The machine code shader programs 162 may include, without limitation, the machine code vertex shader program, the machine code geometry shader program, the machine code fragment shader program, or any number of variations of each. The buffer object memory 163 includes a uniform storage buffer 164, a texture buffer 166 and a vertex buffer 165. The uniform storage buffer 164 stores one or more uniform variables, also called "uniforms." A uniform variable is held constant during a given invocation of the associated shader but may be altered between invocations. The texture buffer 166 stores data elements typically organized in one-dimensional arrays. The vertex buffer 165 stores data elements describing the position and other attributes of vertices provided as inputs to the vertex shader 152.

The texture memory 171 includes texture 172 and frame buffer 168. The texture 172 and the frame buffer 168 include at least one two-dimensional surface that is used to drive the display 170. The frame buffer 168 may include more than one two-dimensional surfaces so that the GPU 150 can render to one two-dimensional surface while a second two-dimensional surface is used to drive the display 170. Data stored within the texture 172 and the frame buffer 168 is typically accessed with the assistance of application specific hardware that provides for a dimensional access view of the data. For example a two-dimensional surface may be addressed with the assistance of a hardware unit that transposes a horizontal and vertical surface location into a physical memory address that corresponds to the location.

The GPU 150 includes a vertex shader 152, a geometry shader 154 and a fragment shader 156 and a memory management unit (MMU) 158. As is well-known, the vertex shader 152 receives a sequence of one or more sets of vertex attributes, where each set of vertex attributes is typically associated with one vertex and one or more vertices are associated with a geometric primitive. The vertex shader 152 processes the vertex attributes, performing such operations as evaluating the vertex's position relative to the viewer and evaluating lighting equations to determine each vertex color. The vertex shader 152 may also use data from the buffer object memory 163 in the GPU local memory 160. For example, the vertex shader 152 may use data from the uniform storage buffer 164 or the texture buffer 166. The machine code vertex shader program executes on the vertex shader 152, imparting specific processing behavior according to specific requirements and specifications of the application program 112. The geometry shader 154 receives sets of processed vertices from the vertex shader 152. The geometry shader 154 performs per-primitive operations on vertices grouped into primitives such as triangles, lines, strips and points emitted by the vertex shader 152, enabling functionality such as shadow volume generation and procedural synthesis. The machine code geometry shader program executes on the geometry shader 154, imparting specific processing behavior according to specific requirements and specifications of the application program 112. A fixed-function rasterizer (not shown) that is situated between the geometry shader 154 and the fragment shader 156 scan converts an individual geometric primitive into a set of fragments with interpolated vertex attributes. The fragment shader 156 processes the fragments, each containing fragment data, which may include raster position, depth or interpolated vertex attributes, such as texture coordinates, opacity, and other relevant per-pixel data, to produce final pixel values. The final pixel values are stored in the frame buffer 168 by a fixed-function raster operations unit (not shown) that also performs operations such as depth and stencil tests as well as any blending of the final pixel values with values currently stored in the frame buffer. The machine code fragment shader program executes on the fragment shader 156, resulting in specific processing behavior according to specific requirements and specifications of the application program 112.

The MMU 158 is configured to map virtual addresses into physical addresses. The MMU 158 includes a set of page table entries (PTEs) used to map a virtual address to a physical address of a page, and optionally includes a cache. The MMU 158 may include address translation lookaside buffers (TLB) or caches which may reside within the GPU 150. The physical address is processed to distribute surface data access locality to allow efficient request interleaving among partition units. The cache may be used to determine whether of not a request for a cache line is a hit or miss, improving the performance of the MMU.

The display 170 is an output device capable of emitting a visual image corresponding to an input data signal. For example, the display may be built using a cathode ray tube (CRT) monitor, a liquid crystal display, or any other suitable display system. The input data signal to the display 170 is typically generated by scanning out the contents of one or more frames of image data that is stored in the frame buffer 168.

Figure 2:
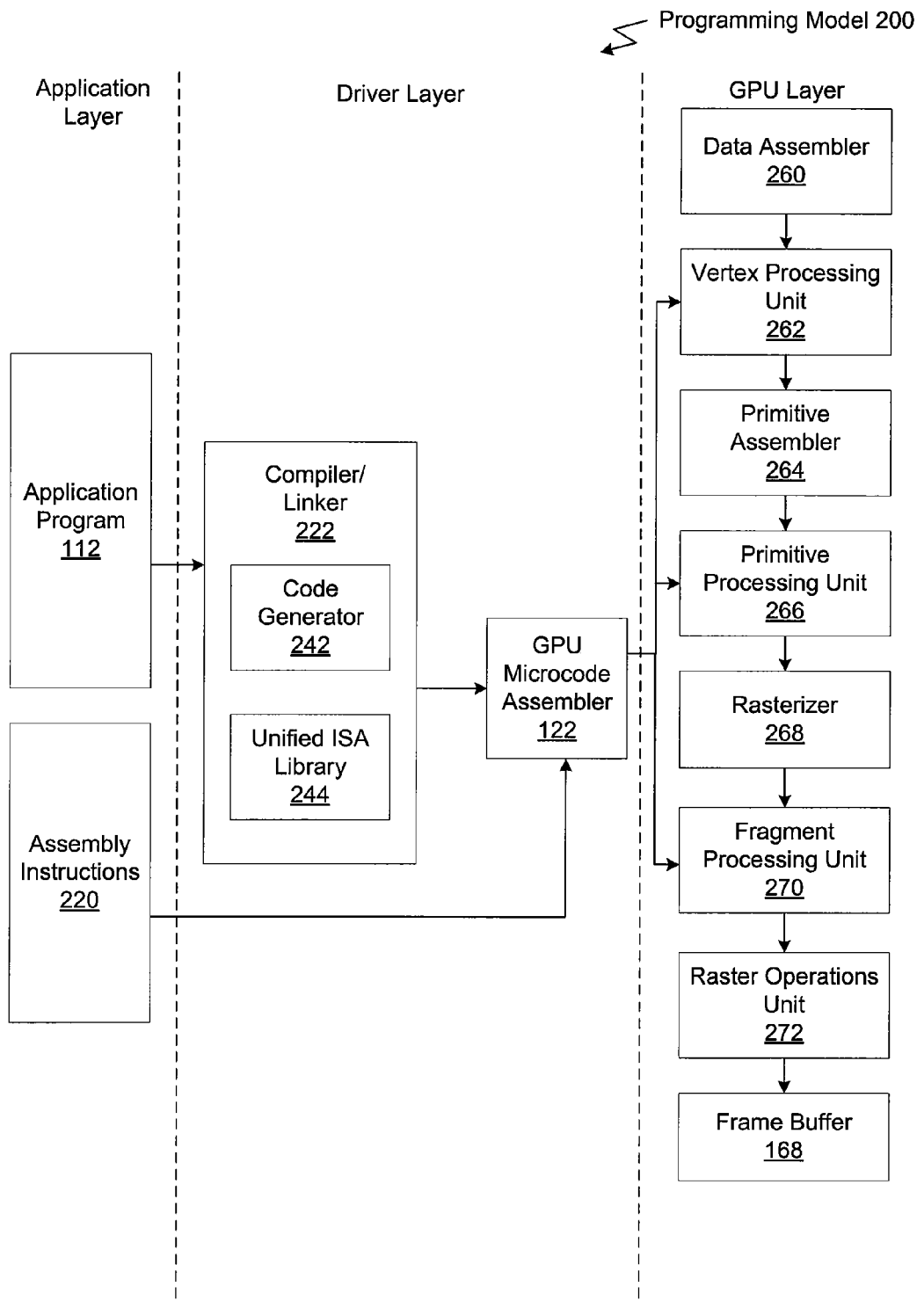
FIG. 2 is a conceptual diagram of a shader programming model, according to one embodiment of the present invention.

FIG. 2 is a conceptual diagram of a shader programming model 200, according to one embodiment of the present invention. As shown, the shader programming model 200 includes the application program 112, which transmits high-level shader programs to the GPU driver 118. The GPU driver 118 then generates machine code programs that are used within the GPU 150 to specify shader behavior within the different processing domains of the GPU 150.

The high-level shader programs transmitted by the application program 112 may include a high-level vertex shader program, a high-level geometry shader program and a high-level fragment shader program. Each of the high-level shader programs is transmitted through an API to the compiler/linker 222 within the GPU driver 118. The compiler/linker 222 compiles the high-level shader programs 114 into assembly language program objects.

Under shader programming model 200, domain-specific shader programs, such as high-level vertex shader programs, high-level geometry shader programs, and high-level fragment shader programs, are compiled using a common instruction set target, supported by unified instruction set architecture (ISA) library 244. With the common instruction set, application developers can compile high-level shader programs in different domains using a core set of instructions having the same syntax and consequently should expect faster compile times for such shader programs. One example of this common ISA is supported by the Unified Instruction Set Architecture ("ISA") developed by NVIDIA Corporation, Santa Clara, U.S.A.

The program objects are transmitted to the GPU microcode assembler 122, which generates machine code programs, including a machine code vertex shader program, a machine code geometry shader program and a machine code fragment shader program. The machine code vertex shader program is transmitted to a vertex processing unit 262 for execution. Similarly, the machine code geometry shader program is transmitted to a primitive processing unit 266 for execution and the machine code fragment shader program is transmitted to a fragment processing unit 270 for execution.

Shader programs can also be transmitted by the application program 112 via assembly instructions 220. The assembly instructions 220 are transmitted directly to the GPU microcode assembler 122 which then generates machine code programs, including a machine code vertex shader program, a machine code geometry shader program and a machine code fragment shader program, as previously described herein.

A data assembler 260 and the vertex processing unit 262 function as the vertex shader 152 of FIG. 1. The data assembler 260 is a fixed-function unit that collects vertex data for high-order surfaces, primitives, and the like, and outputs the vertex data to vertex processing unit 262. The data assembler 260 may gather data from buffers stored within system memory 110 and GPU local memory 160 as well as from API calls from the application program 112 used to specify vertex attributes. The vertex processing unit 262 is a programmable execution unit that is configured to execute a machine code vertex shader program, transforming vertex data as specified by the vertex shader programs. For example, vertex processing unit 262 may be programmed to transform the vertex data from an object-based coordinate representation (object space) to an alternatively based coordinate system such as world space or normalized device coordinates (NDC) space. The vertex processing unit 262 may read vertex attribute data directly from the GPU local memory 160 via the buffer load mechanism described below. The vertex processing unit 262 may read texture map data as well as uniform data that is stored in GPU local memory 160 through an interface (not shown) for use in processing the vertex data. The vertex shader 152 represents the vertex processing domain of the GPU 150.

A primitive assembler 264 and the primitive processing unit 266 function as the geometry shader 154. A second primitive assembler (not shown) may be included subsequent to the primitive processing unit 266 in the data flow through the GPU 150. The primitive assembler 264 is fixed-function unit that receives processed vertex data from vertex processing unit 262 and constructs graphics primitives, e.g., points, lines, triangles, or the like, for processing by primitive processing unit 266. In prior art systems, the primitive processing unit performs well-known, fixed-function viewport operations such as clipping, projection and related transformations on the incoming vertex data. In the GPU 150, the primitive processing unit 266 is a programmable execution unit that is configured to execute a machine code geometry shader program to process graphics primitives received from the primitive assembler 264 as specified by the geometry shader program. For example, in addition to well-known viewport operations, the primitive processing unit 266 may be programmed to subdivide the graphics primitives into one or more new graphics primitives and calculate parameters, such as plane equation coefficients, that are used to rasterize the new graphics primitives. The primitive processing unit 266 may read data directly from the GPU local memory 160 via the buffer load mechanism described below. Additional the primitive processing unit 266 may read texture map data that is stored in GPU local memory 160 through an interface (not shown) for use in processing the geometry data. The geometry shader 154 represents the geometry processing domain of the GPU 150. The primitive processing unit 266 outputs the parameters and new graphics primitives to a rasterizer 268. The rasterizer 268 is a fixed-function unit that converts the new graphics primitives and outputs fragments and coverage data to the fragment processing unit 270.

The fragment processing unit 270 performs the functions of the fragment shader 156 of FIG. 1. The fragment processing unit 270 is a programmable execution unit that is configured to execute machine code fragment shader programs to transform fragments received from rasterizer. For example, the fragment processing unit 270 may be programmed to perform operations such as perspective correction, texture mapping, shading, blending, and the like, to produce shaded fragments that are output to a raster operations unit 272. The primitive processing unit 266 may read data directly from the GPU local memory 160 via the buffer load mechanism described below. Additionally, the fragment processing unit 270 may read texture map data as well as uniform data that is stored in local memory 160 through an interface (not shown) for use in processing the fragment data. The raster operations unit 272 optionally performs fixed-function computations such as near and far plane clipping and raster operations, such as stencil, z test and the like, and outputs pixel data as processed graphics data for storage in a buffer in the GPU local memory 160, such as the frame buffer 168.

Figure 3:
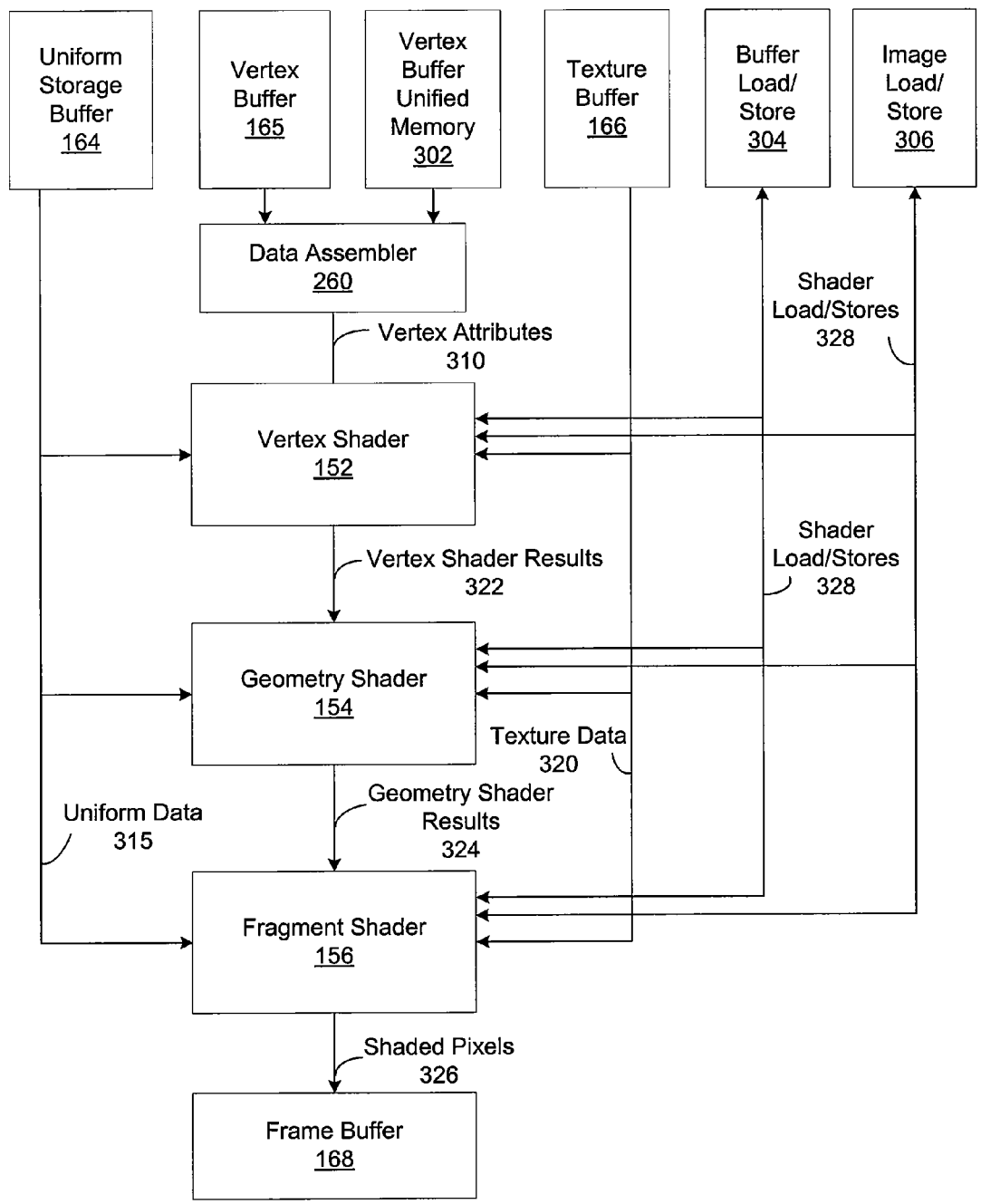
FIG. 3 is a data flow diagram of a programmable graphics pipeline residing within the GPU of FIG. 1, according to one embodiment of the present invention.

FIG. 3 is a data flow diagram of a programmable graphics pipeline residing within the GPU of FIG. 1, according to one embodiment of the present invention. The vertex shader 152, the geometry shader 154 and the fragment shader 156 of FIG. 1 are configured according to the shader programming model 200 of FIG. 2.

The vertex shader 152 executes the machine code vertex shader program in order to process a stream of vertex attributes 310 received from the vertex buffer 165 or a vertex buffer unified memory 302 via the data assembler 260. The vertex attributes 310 received from the vertex buffer unified memory 302 are attached to a vertex state set in an application context of the application program 112. The vertex shader 152 may access data from additional sources, such as uniform data 315 from the uniform storage buffer 164, texture data 320 from the texture buffer 166 and via the buffer load mechanism 304. The vertex shader results 322 are transmitted to the geometry shader 154, which processes the vertex shader results 322 according to the machine code geometry shader program. The geometry shader 154 may access data from additional sources, such as uniform data 315 from the uniform storage buffer 164, texture data 320 from the texture buffer 166 and via the buffer load mechanism 304. The geometry shader results 324 are transmitted to the fragment shader 156. The fragment shader 156 executes the machine code fragment shader program in order to process the geometry shader results 324. The fragment shader 156 may access data from additional sources, such as uniform data 315 from the uniform storage buffer 164, texture data 320 from the texture buffer 166 and via the buffer load mechanism 304. The output of the fragment shader 156 includes a stream of shaded pixels 326 that are written to the frame buffer 168.

In addition, each of the vertex shader 152, the geometry shader 154 and the fragment shader 156 may retrieve data from and write data to buffer objects stored within the buffer object memory 163 via the buffer load/store mechanism 304. Similarly, each of the vertex shader 152, the geometry shader 154 and the fragment shader 156 may retrieve texture data and write texture data to image units (not shown) stored within texture memory 171 via the image load/store mechanism 306.

Memory Barriers

Programmable graphics pipelines typically execute a plurality of vertex, geometry, and fragment shader programs within the vertex shader 152, the geometry shader 154, and the fragment shader 156, respectively. The simultaneous execution of one or more programs within a processor is known in the art as "multi-threading." Such multi-threading results in execution order and synchronization inaccuracies of graphics command streams received by the vertex shader 152, the geometry shader 152 and/or the fragment shader 156, as the order in which texture or buffer object memory locations are read from or written to by the multiple threads is largely undefined.

More specifically, memory operations that are required by particular commands may be reordered for execution by the GPU in an order that was not originally specified within the graphics command stream. Examples of such memory operations include, but are not limited to, vertex attribute load operations, vertex index load operations, uniform shader parameter load operations, texture load operations, texture update operations, framebuffer load and store operations, buffer accesses, global load and store operations, or image load and store operations.

The aforementioned synchronization inaccuracies can and have been avoided in the prior art by automatically synchronizing based on analysis of how the memory is used by the application. Such automatic synchronization mechanisms provide a collection of attachment points to which portions of the memory are bound. In such a system, the application program 112 binds portions of the buffer object memory 163 and texture memory 171 for use for different purposes, including uniform storage 164, vertex storage 165, texture 166, and for receiving shaded pixels 326. For each block of memory, the GPU driver 118 tracks the operations for which the block is available and performs required synchronization before the block is used for a different purpose. For example, if a block of memory is bound to receive shaded pixels 326, and is later re-bound for use as a texture buffer 166, the driver detects the new use for the memory, and flushes any previously generated commands to ensure that all shaded pixels 326 intended for the block of memory have been completed prior to treating the memory as a texture buffer 166.

Such automatic synchronization provides significant burdens on both the application program 112 and GPU driver 118. The application program is required to make API calls to repeatedly bind and unbind these blocks of memory, and the GPU driver is required to continually track the usage of each block of memory. The computational burden of these operations on the CPU 102 will reduce the performance of the application program. Additionally, to limit the overhead involved in these operations, the GPU driver might impose functional limitations on the application such as imposing limits on the total number of blocks of memory that can be bound at any one time.

To alleviate the aforementioned synchronization inaccuracies while avoiding the overhead of the automatic synchronization mechanism discussed above, we can provide explicit synchronization commands into the received graphics command streams. Explicit synchronization ensures that the effects of buffer and texture data stores performed by one or more shader programs to a portion of memory are visible to subsequent commands that access the same portion of memory. For example, a graphics command stream may include one or more memory operations that are completed in an undefined order. To provide a defined order of execution, the GPU 150 may perform an explicit synchronization at various points within the graphics command stream. This can be accomplished by configuring the GPU 150 to track the execution state of each of the commands in order to effectively determine whether all commands have completed in execution.

The memoryBarrierNV( ) OpenGL Shading Language (GLSL) operation—along with the "MEMBAR" assembly operation, provides explicit synchronization that ensures a proper ordering of read and write operations within a shader thread. Memory operations scheduled for execution prior to the memory barrier command are all guaranteed to have completed to a point of coherence when the memory barrier command completes in execution. Further, the compiler does not re-order any load and store memory operations that are scheduled to execute subsequent to a memory barrier command, preventing any automatic optimizations from compromising the guaranteed point of coherence while permitting optimizations between barriers.

The memory barrier command provides stronger ordering of read and write operations performed by a single thread. When a memory barrier command is executed, any memory operations issued by the thread prior to the memory barrier command are guaranteed to be completed before any subsequent memory operations are performed. Memory barrier commands are needed for algorithms that allow multiple threads to access the same memory location. For such algorithms, memory operations associated with that memory location need to be performed in a partially-defined relative order.

For example, if one shader thread performs a series of write operations, followed by a memory barrier command, followed by another write operation, then another shader thread that is able to view the results of the final write operation is also able to view the previous write operations. Without the memory barrier command, the final write operation may be visible before the previous write operations.

As described in greater detail below with respect to FIG. 4, high-level memory barrier (memoryBarrierNV( )) commands are executable, by the GPU 150, within a stream of graphics API operations, where the memory barrier commands guarantee the synchronization of memory operations scheduled to be executed in a pipeline prior to the execution of each memory barrier command.

Figure 4:
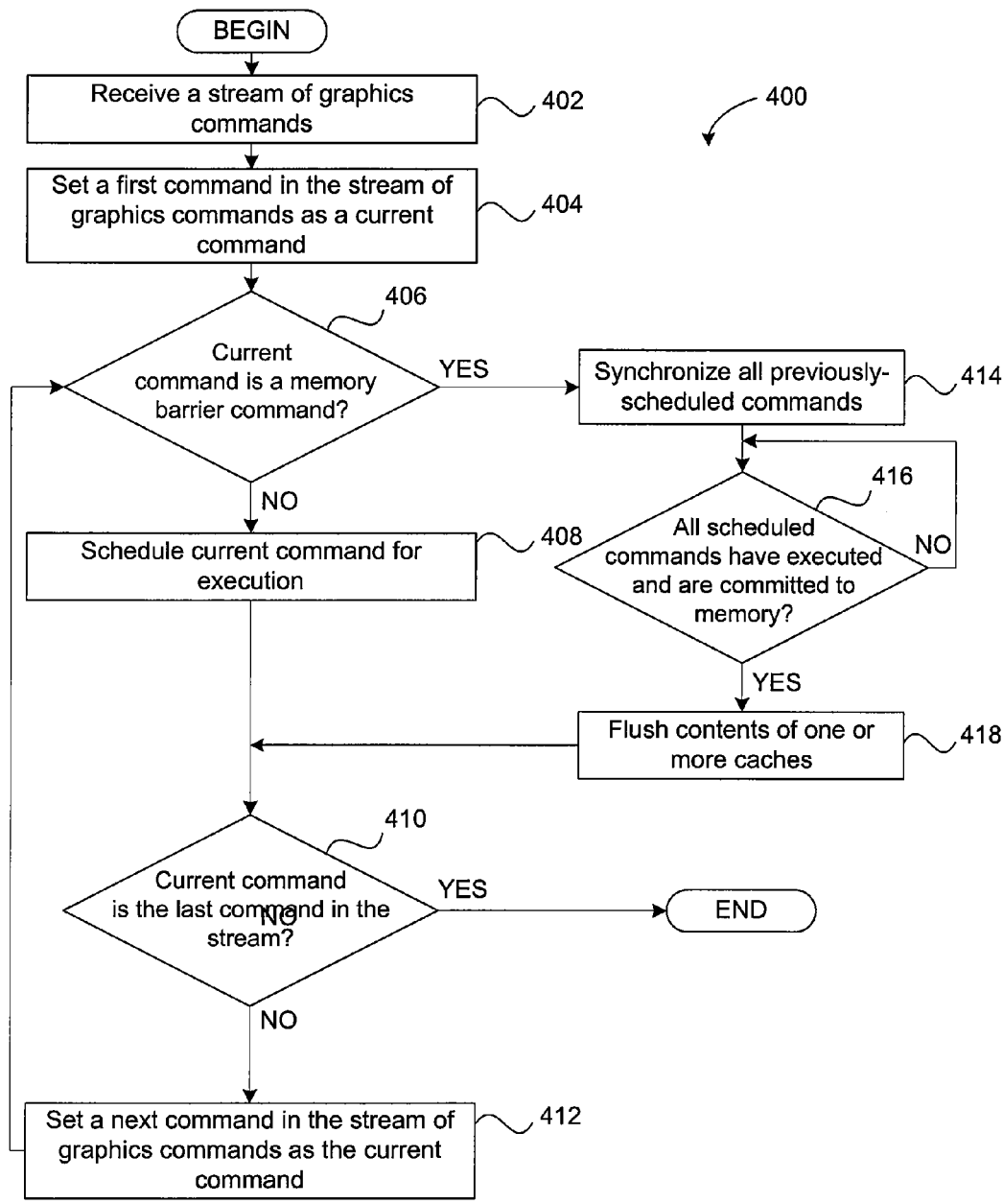
FIG. 4 is a flow diagram of method steps for executing a memory barrier command within a stream of graphics application program interface (API) commands, according to one embodiment of the present invention.

FIG. 4 is a flow diagram of method steps for executing a memory barrier command within a stream of graphics application programming interface (API) commands, according to one embodiment of the present invention. Although the method steps are described in conjunction with the systems for FIGS. 1-3, persons skilled in the art will understand that any system configured to perform the method steps, in any order, is within the scope of the invention.

The method 400 begins at step 402, where the GPU 150 receives a stream of graphics commands from the application program 112. At step 404, the GPU 150 sets a first command in the stream of graphics commands as a current command. At step 406, the GPU 150 determines whether the current command is a memory barrier command. If, at step 406, the GPU 150 determines that the current command is not a memory barrier command, then the step 408 follows.

At step 408, the GPU 150 schedules the current command for execution within the GPU 150. In one embodiment, the current command may specify a new set of primitives to process, perform updates to buffer or texture memory, or update one of several registers controlling the processing of subsequent primitives. Some of these commands will trigger execution of shaders that perform global load and store operations or image load and store operations. At step 410, the GPU 150 determines whether the current command is the last command in the stream. If, at step 410, the GPU determines that the current command is not the last command in the command stream, then the step 412 follows.

At step 412, the GPU 150 sets a next command in the stream of graphics commands as the current command, and the step 406 is repeated as described above.

Referring back to step 406, if the GPU 150 determines that the current command is a memory barrier command, then the step 414 follows. At step 414, the GPU 150 synchronizes all previously-scheduled commands. Such commands may include one or more memory operations that are completed in an undefined order. Thus, the GPU 150 is required to track the execution state of each of the commands in order to effectively determine whether all previously-scheduled commands have synchronized. For example, the GPU 150 may inject a command into its processing pipeline to notify it when each has completed. For example, such a command may write a value to an address in GPU local memory 160 or to a GPU register. Accordingly, the GPU 150 does not complete the memory barrier command until a notification has been received for each and every previously scheduled memory operation. In addition, the memory barrier command may include a bitfield that indicates to the GPU 150 a type of memory load and store operations, as described above in step 408. Distinguishing such commands further enables the GPU to accurately synchronize the previously-scheduled memory operations, and to avoid potentially expensive synchronizations of operations not requiring explicit synchronization.

At step 416, the GPU 150 determines whether all scheduled commands have executed and are committed to memory. In one embodiment, the scheduled commands may include read and/or write operations to a particular image units stored in texture memory 171 via the image load/store mechanism 306. The GPU 150 performs an analysis of the execution progress of the commands scheduled in step 408. If, at step 416, the GPU 150 determines that all scheduled commands have either not executed or have not committed to memory, then the step 416 is repeated through looping performed by the GPU 150. Alternatively, if the GPU 150 determines that all scheduled commands have executed and are committed to memory, then the step 418 follows.

At step 418, the GPU 150 flushes contents of one or more caches. The GPU 150 implementation of uniform storage 164, vertex pulling 165, texture mapping 166, buffer loads and stores 304, and image loads and stores 306 may involve local caches that might not be automatically synchronized with other types of memory operations. Flushing the contents of one or more caches guarantees that these caches do not contain any stale data for memory updated by the commands scheduled in step 408 and thus will not influence the subsequent execution of commands included in the command stream. The step 410 is then repeated.

Referring back to step 410, if the GPU 150 determines that the current command is the last command in the command stream, then the method 400 ends.

As described above in the method 400, the memory barrier command guarantees the synchronization of commands scheduled to be executed in the pipeline prior to the execution of the memory barrier command. Such commands may include one or more memory transactions that are also required to be completed prior to the execution of the memory barrier command. In one embodiment, the graphics command stream includes commands that generate a first image and a second image, where the second image is derived from the first image. Accordingly, the creation of the first image must be completed prior to the creation of the second image. To ensure that the second image is successfully created, the command stream would include a command to create the first image, a command to execute a memory barrier, and a command to create the second image from the first image. Thus, the command to create the second image from the first image would only execute when the creation of the first image had completed in execution.

As described in greater detail below with respect to FIG. 5, memory barrier (MEMBAR) assembly commands are executable by, for example, the vertex shader 152, the geometry shader 154, or the fragment shader 156, where each memory barrier command guarantees that all memory operations scheduled for execution prior to the memory barrier command have completed.

Figure 5:
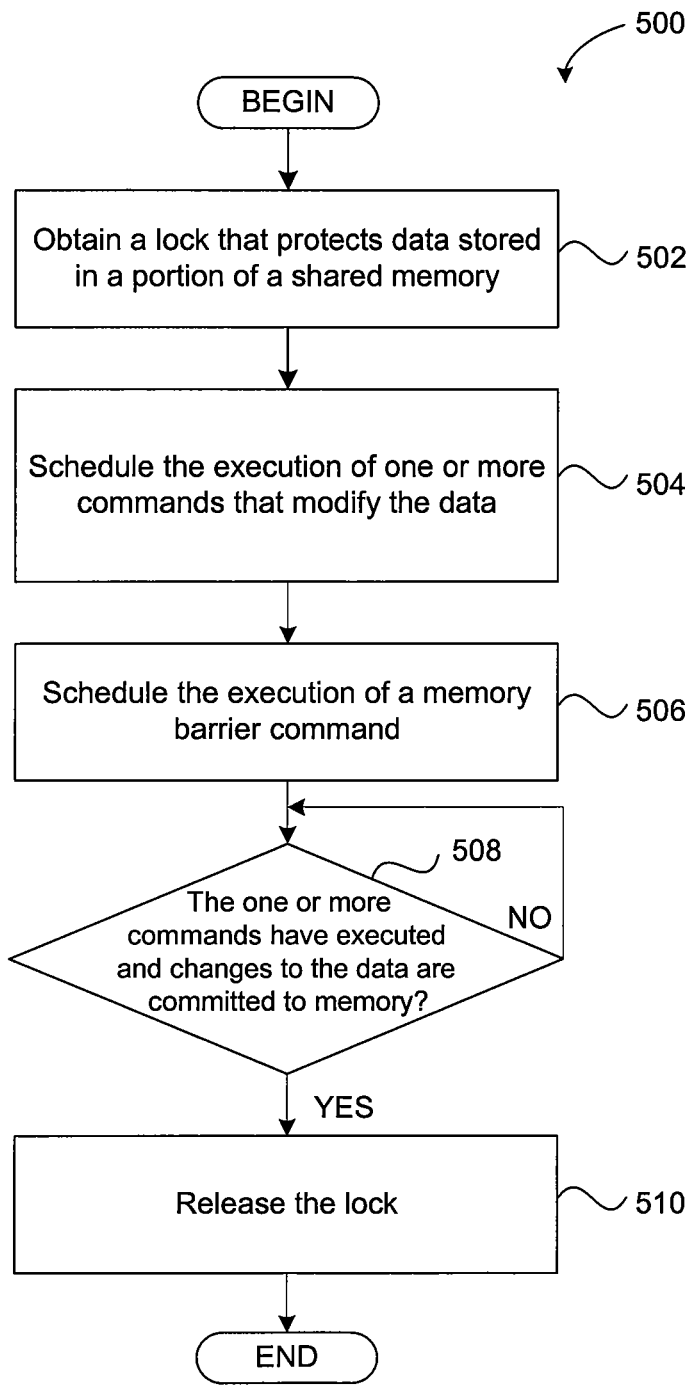
FIG. 5 is a flow diagram of method steps for executing a memory barrier command in the context of a shader program that has multiple program invocations update a single shared block of memory, according to one embodiment of the present invention.

FIG. 5 is a flow diagram of method steps for executing a memory barrier command in the context of a shader program that has multiple program invocations update a single shared block of memory according to one embodiment of the present invention. Although the method steps are described in conjunction with the systems for FIGS. 1-3, persons skilled in the art will understand that any system configured to perform the method steps, in any order, is within the scope of the invention.

The method 500 begins at step 502, where a shader program obtains a lock that protects data stored in a portion of a shared memory. In one embodiment, the shader program operates, in conjunction with a plurality of additional shader programs, on a shared portion of memory. For example, the shader 152 of FIG. 3 may be configured to simultaneously execute one or more shader programs. The shared portion of memory is typically found in GPU local memory 160 and is accessible to each of the shader program invocations.

At step 504, the shader program schedules the execution of one or more commands that modify the data stored in the shared portion of memory. In one embodiment, each of the one or more commands updates a counter variable that is stored in the shared portion of memory. At step 506, the shader program schedules the execution of a memory barrier command.

At step 508, the shader program determines whether the one or more commands have executed and changes to the data are committed to memory. If, at step 508, the shader program determines that not all of the scheduled commands have executed nor have all changes to the data been committed to memory, then the step 508 is repeated through looping performed by the shader program. Otherwise, the step 510 follows, where the shader program releases the lock and the method 500 ends.

As described above in the method 500, the memory barrier command guarantees that all commands scheduled for execution prior to the memory barrier command have completed.

Accordingly, when the shader program releases the lock that protects data stored in the shared portion of memory, any additional shader invocation that subsequently obtains the lock operates on that data will be guaranteed to see the results of all memory operations performed by prior invocations that held the lock. Additionally, the memory protected by the lock will not be overwritten by requests that were previously scheduled.

Extensions to the OpenGL API, the OpenGL Shading Language (GLSL) and related APIs to support memory coherency in graphics command streams and shaders are discussed below. Persons skilled in the art will appreciate that the information in this section should be considered in conjunction with the OpenGL 3.2 and GLSL 1.50 specifications and would be equally applicable to other versions of these specifications. Importantly, the extensions presented herein introduce three new OpenGL extensions. The first extension titled GL_NV_gpu_program5 provides support for memory barrier commands between draw calls (MemoryBarrierNV( )), which ensure ordering between memory stores and other operations, and further provides support for memory barrier commands within shader programs through the MEMBAR opcode, which ensures that all memory stores issued prior to the opcode complete prior to any subsequent memory operations. The second extension titled GL_NV_shader_buffer_store provides support for shaders to perform random-access write operations to buffer object memory without requiring dedicated buffer object binding points. The third extension titled GL_NV_shader_image_load_store provides assembly commands and GLSL built-in operations to load from and store to texture levels in any shader stage, and new entry points to bind images for utilization by those commands.

The operation
void MemoryBarrierNV(bitfield barriers)
defines a barrier that orders the memory operations issued prior to the memory barrier command relative to those issued after the memory barrier command, including invalidating the appropriate caches. For the purposes of this ordering, memory operations performed by shaders are considered to be issued by the rendering command that triggered the execution of the shader. <barriers> is a bitfield indicating the set of operations that are synchronized with shader stores. The <barriers> bits are listed below.

VERTEX_ATTRIB_ARRAY_BARRIER_BIT_NV: If set, vertex data sourced from buffer objects after the memory barrier command reflect data written by shaders prior to the memory barrier command. The set of buffer objects affected by this bit is derived from the buffer object bindings or GPU addresses for generic vertex attributes (VERTEX_ATTRIB_ARRAY_BUFFER bindings, VERTEX_ATTRIB_ARRAY_ADDRESS from NV_vertex_buffer_unified_memory), as well as those for arrays of named vertex attributes (e.g., vertex, color, normal).

ELEMENT_ARRAY_BARRIER_BIT_NV: If set, vertex array indices sourced from buffer objects after the memory barrier command reflect data written by shaders prior to the memory barrier command. The buffer objects affected by this bit are derived from the ELEMENT_ARRAY_BUFFER binding and the NV_vertex_buffer_unified_memory ELEMENT_ARRAY_ADDRESS address.

UNIFORM_BARRIER_BIT_NV: Shader uniforms and assembly program parameters sourced from buffer objects after the memory barrier command reflect data written by shaders prior to the memory barrier command.

TEXTURE_FETCH_BARRIER_BIT_NV: Texture fetches from shaders, including fetches from buffer object memory via buffer textures, after the memory barrier command reflect data written by shaders prior to the memory barrier command.

SHADER_GLOBAL_ACCESS_BARRIER_BIT_NV: Shader global loads/stores/atomics in any subsequent commands reflect data written by global/image stores resulting from shader executions initiated prior to this command, and shader global write operations in subsequent commands land after any memory accesses (loads, stores, texture fetches, vertex fetches, etc) in previous commands have completed.

SHADER_IMAGE_ACCESS_BARRIER_BIT_NV: Memory accesses through shader image load, store, and atomic built-in operations issued after the memory barrier command reflect data written by shaders prior to the memory barrier command. Additionally, image stores and atomics issued after the memory barrier command do not execute until all memory accesses (e.g., loads, stores, texture fetches, vertex fetches) initiated prior to the memory barrier command complete.

COMMAND_BARRIER_BIT_NV: Command data sourced from buffer objects by Draw*Indirect commands after the memory barrier command reflect data written by shaders prior to the memory barrier command. The buffer objects affected by this bit are derived from the DRAW_INDIRECT_BUFFER_NV binding and the GPU address DRAW_INDIRECT_ADDRESS_NV.

PIXEL_BUFFER_BARRIER_BIT_NV: Read and/or write operations of buffer objects via the PACK/UNPACK_BUFFER bindings (ReadPixels, TexSubImage, etc.) after the memory barrier command reflect data written by shaders prior to the memory barrier command. Additionally, buffer object write operations issued after the memory barrier command wait on the completion of all shader write operations initiated prior to the memory barrier command.

TEXTURE_UPDATE_BARRIER_BIT_NV: Write operations to a texture via Tex(Sub)Image*, CopyTex(Sub)Image*, CompressedTex(Sub)Image*, and performs a read operation via GetTexImage after the memory barrier command reflect data written by shaders prior to the memory barrier command. Additionally, texture write operations from these commands issued after the memory barrier command do not execute until all shader write operations initiated prior to the memory barrier command complete.

BUFFER_UPDATE_BARRIER_BIT_NV: Read and/or write operations via Buffer(Sub)Data, MapBuffer(Range), CopyBufferSubData, ProgramBufferParameters, and GetBufferSubData after the memory barrier command reflect data written by shaders prior to the memory barrier command. Additionally, write operations via these commands issued after the memory barrier command wait on the completion of all shader write operations initiated prior to the memory barrier command.

FRAMEBUFFER_BARRIER_BIT_NV: Read and/or write operations via framebuffer object attachments after the memory barrier command reflect data written by shaders prior to the memory barrier command. Additionally, framebuffer write operations issued after the memory barrier command wait on the completion of all shader write operations issued prior to the memory barrier command.

TRANSFORM_FEEDBACK_BARRIER_BIT_NV: Write operations via transform feedback bindings after the memory barrier command reflect data written by shaders prior to the memory barrier command. Additionally, transform feedback write operations issued after the memory barrier command wait on the completion of all shader write operations issued prior to the memory barrier command.

Implementations may have multiple levels of caching for global memory load and store operations. To allow for the best performance, the first level of the cache may not be coherent across all shader threads. That is, stores from one thread may not be observable in other threads because the store operation "stuck" in the L1 cache of the storing thread or the old data stuck in the L1 cache of the loading thread. To allow such cross-thread communication in assembly shader programs, both load and store operations may utilize the "COH" opModifier to indicate that coherent behavior across threads is mandatory, in which case load operations bypass the L1 cache and store operations are written through to a coherent level of the cache hierarchy. It is permissible to utilize both non-COH and COH loads/stores on the same address, and the COH commands bypass the non-coherent caches.

Different levels of caching in the GPU may be automatically coherent with other caches, cache levels, and main GPU memory. However, some caches may not be coherent for performance, area, and power reasons. For example, the GPU may include many arithmetic logic units (ALUs) and memory partitions to permit many shader program invocations and in parallel. To provide coherent caching, a large and expensive network would be required to broadcast information on each memory transaction to each cache. In general, it is expected that the level of caching closest to the ALU (the "L1" cache) may not be coherent with L1s from other ALUs. The level of caching farthest away from the ALUs is likely coherent such that coherency does not depend on a round-trip to off-chip memory.

Memory accesses to image variables declared by the coherent storage qualifier are performed coherently with similar accesses from other shader threads. In particular, when reading a variable declared as coherent, the values returned reflect the results of previously completed write operations performed by other shader threads. When writing to a variable that is declared as coherent, the values written are reflected in subsequent coherent read operations performed by other shader threads. Because shader program invocations are executed in a pipelined fashion with multiple parallel execution units, shader memory read and write operations complete in a largely undefined order. The built-in operation memoryBarrierNV( ) guarantees the completion and relative ordering of memory accesses performed by a single shader thread. When accessing memory through variables not declared as coherent, the memory accessed by a shader is cacheable by the implementation to service future accesses to the same address. Memory stores are cached in such a way that the values written are not be visible to other shader threads accessing the same memory. The implementation may cache the values fetched by memory read operations and return the same values to any thread accessing the same memory, even if the underlying memory has been modified since the first memory read operation. While variables not declared as coherent are not useful for communicating between shader threads, non-coherent accesses may result in higher performance.

The "volatile" type qualifier (or ".VOL" in the assembly) ensures that the compiler does not eliminate redundant read operations to the same memory address or texel of an image. This can be useful in conjunction with a coherent type qualifier if another thread in a same draw command writes a value on which this thread is waiting.

Memory accesses to image variables declared as volatile must treat the underlying memory as though it could be read from or written to at any point during shader execution by some source other than the executing thread. When a volatile variable is read, the value must be re-fetched from the underlying memory, even if the thread performing the read operation had already fetched the value from the same memory. When a volatile variable is written, the value must be written to the underlying memory, even if the compiler can conclusively determine that the value is to be overwritten by a subsequent write operation. Since there is a possibility that the external source reading or writing a volatile variable is another shader thread, variables declared as volatile are automatically treated as coherent.

The following examples clarify the appropriate usage of coherent memory accesses and memory barrier commands.

When working with read-only or constant data, neither coherent memory accesses nor memory barrier commands should be performed.

When sharing data between threads at a fine granularity, coherent memory accesses should be performed on all loads and stores.

When data is written by one thread and consumed by other threads launched as a result of the execution of the one thread, coherent memory accesses should be performed, followed by a memory barrier command in the one thread. Further, the dependent threads should perform coherent memory loads when loading the data written by the first thread.

When data is written by one rendering pass and read by shader loads in a subsequent pass, a memory barrier command should be called with the SHADER_GLOBAL_ACCESS_BARRIER_BIT_NV between the passes, as described above.

Finally, when data is written by one rendering pass and read by an operation other than shader global/image loads, the MemoryBarrierNV( ) should be called with the appropriate bits between passes.

Atomic memory commands (ATOM) read and write a given memory address atomically. While ATOM commands issued by multiple program executions are executed in undefined order relative to each other, these atomic commands perform both a read and a write operation to a memory address and guarantee that no other memory operation write operations are performed to the underlying memory between the read and write operations. Atomics allow programs to utilize shared global addresses for mutual exclusion and counters, or the like. Atomic commands are automatically coherent.

One embodiment of the invention is implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention is implemented as a program product deployed for use over a network. In such an embodiment, the program product accessed via a web browser.

The invention has been described above with reference to specific embodiments. Persons skilled in the art, however, will understand that various modifications and changes made thereto without departing from the broader spirit and scope of the invention as set forth in the appended claims. The foregoing description and drawings are, accordingly, to be regarded in an illustrative rather than a restrictive sense.

We claim:

1. A computer-implemented method for controlling memory access operations, the method comprising:
   receiving a stream of graphics commands for execution within a single graphics processing unit (GPU), the stream of commands including a first set of memory access operations, a second set of memory access operations, and a memory barrier command interleaved between the first set of memory access operations and the second set of memory access operations;
   scheduling the first set of memory access operations, the memory barrier command, and the second set of memory access operations for execution within the single GPU;
   initiating execution of the first set of memory access operations;
   initiating execution of the memory barrier command;
   in response to initiating execution of the memory barrier command, completing the execution of each memory access operation in the first set of memory access operations to a point of coherency, while not initiating execution of the second set of memory access operations;
   completing the execution of the memory barrier command; and
   subsequent to completing execution of the memory barrier command, initiating execution of the second set of memory access operations.

2. The method of claim 1, wherein the memory barrier command, through a bitfield input, completes execution when a specific type of memory store and load operation specified by the bitfield input for commands specified prior to the memory barrier command have completed execution to a point of coherency.

3. The method of claim 2, wherein the specific type of memory store and load operation comprises a vertex attribute load operation, a vertex index load operation, a uniform shader parameter load operation, a texture load operation, a texture update operation, a framebuffer load or store operation, a buffer access operation, a global load or store operation, or an image load or store operation.

4. The method of claim 2, wherein the memory barrier command, when executed, invalidates a memory that is accessible to a plurality of threads executing the stream of graphics commands.

5. The method of claim 1, wherein at least one graphics command included in the stream of graphics commands is associated with an operation to access a texture image level via an entry point that binds a memory block that includes the texture level image.

6. The method of claim 1, wherein the stream of graphics commands are configured for execution within a single module of the single GPU.

7. A computer-implemented method for controlling memory access operations, the method comprising:
   receiving a sequence of shader instructions that includes a first set of memory access operations, a second set of memory access operations, and at least one of a memory barrier instruction interleaved between the first set of memory access operations and the second set of memory access operations, a memory access instruction marked as coherent, and a memory access instruction marked as volatile;
   scheduling the first set of memory access operations and the second set of memory access operations for execution;
   initiating execution of the first set of memory access operations; and
   for each shader instruction in the sequence of shader instructions that comprises either a memory barrier instruction, a memory access instruction marked as coherent, or a memory access instruction marked as volatile, executing the shader instruction; and
   if the shader instruction comprises a memory barrier instruction, then:
     scheduling the memory barrier command for execution;
     initiating execution of the memory barrier command;
     in response to initiating execution of the memory barrier command, completing the execution of each memory access operation in the first set of memory access operations to a point of coherency, while not initiating execution of the second set of memory access operations;
     completing the execution of the memory barrier command; and
     subsequent to completing execution of the memory barrier instruction, initiating execution of the second set of memory access operations,
   if the shader instruction is a memory access instruction marked as coherent, then transmitting data to or retrieving data from a memory that is accessible by a plurality of threads executing a shading program, and
   if the shader instruction is a memory access instruction marked as volatile, then not eliminating redundant read or write operations involving an address associated with the memory access instruction.

8. The method of claim 7, wherein the sequence of shader instructions is specified by one or more Open Graphics Library (OpenGL) application program interface (API) calls.

9. The method of claim 7, wherein each of the memory access instructions comprises a vertex attribute load operation, a vertex index load operation, a uniform shader parameter load operation, a texture load operation, a texture update operation, a framebuffer load or store operation, a buffer access operation, a global load or store operation, or an image load or store operation.

10. The method of claim 7, wherein the sequence of shader instructions includes at least one memory barrier instruction and also includes at least one memory access instruction marked as coherent.

11. The method of claim 7, wherein the sequence of shader instructions includes at least one memory barrier instruction and also includes at least one memory access instruction marked as volatile.

12. The method of claim 7, wherein the sequence of shader instructions includes at least one memory access instruction marked as coherent and also includes at least one memory access instruction marked as volatile.

13. The method of claim 7, wherein the sequence of shader instructions includes at least one memory barrier instruction, at least one memory access instruction marked as coherent, and at least one memory access instruction marked as volatile.

14. A non-transitory computer readable medium including instructions that, when executed by a processing unit of a computer system, causes the processing unit to control memory access operations, by performing the steps of:
   receiving a sequence of shader instructions that includes a first set of memory access operations, a second set of memory access operations, and at least one of a memory barrier instruction interleaved between the first set of memory access operations and the second set of memory access operations, a memory access instruction marked as coherent, and a memory access instruction marked as volatile;

scheduling the first set of memory access operations and the second set of memory access operations for execution;

initiating execution of the first set of memory access operations; and for each shader instruction in the sequence of shader instructions that comprises either a memory barrier instruction, a memory access instruction marked as coherent, or a memory access instruction marked as volatile, executing the shader instruction; and if the shader instruction comprises a memory barrier instruction, then scheduling the memory barrier command for execution;

initiating execution of the memory barrier command;

in response to initiating execution of the memory barrier command, completing the execution of each memory access operation in the first set of memory access operations to a point of coherency, while not initiating execution of the second set of memory access operations;

completing the execution of the memory barrier command; and subsequent to completing execution of the memory barrier instruction, initiating execution of the second set of memory access operations, if the shader instruction is a memory access instruction marked as coherent, then transmitting data to or retrieving data from a memory that is accessible by a plurality of threads executing a shading program, and if the shader instruction is a memory access instruction marked as volatile, then not eliminating redundant read or write operations involving an address associated with the memory access instruction.

15. The non-transitory computer readable medium of claim 14, wherein the sequence of shader instructions is specified by one or more Open Graphics Library (OpenGL) application program interface (API) calls.

16. The non-transitory computer readable medium of claim 14, wherein each of the memory access instructions comprises a vertex attribute load operation, a vertex index load operation, a uniform shader parameter load operation, a texture load operation, a texture update operation, a framebuffer load or store operation, a buffer access operation, a global load or store operation, or an image load or store operation.

17. The non-transitory computer readable medium of claim 14, wherein the sequence of shader instructions includes at least one memory barrier instruction and also includes at least one memory access instruction marked as coherent.

18. The non-transitory computer readable medium of claim 14, wherein the sequence of shader instructions includes at least one memory barrier instruction and also includes at least one memory access instruction marked as volatile.

19. The non-transitory computer readable medium of claim 14, wherein the sequence of shader instructions includes at least one memory access instruction marked as coherent and also includes at least one memory access instruction marked as volatile.

20. The non-transitory computer readable medium of claim 14, wherein the sequence of shader instructions includes at least one memory barrier instruction, at least one memory access instruction marked as coherent, and at least one memory access instruction marked as volatile.

* * * * *